Patented Apr. 18, 1950

2,504,427

UNITED STATES PATENT OFFICE 2,504,427

N-SUBSTITUTED ALKENYLOXYACET-
AMIDES

Lowell B. Kilgore, Washington, D. C.

No Drawing. Application August 19, 1947,
Serial No. 769,515

18 Claims. (Cl. 167—22)

This invention relates to new organic compounds, more particularly to a new class of amides and specifically to N-substituted α-etherified acetamides and methods for their preparation.

This is a continuation-in-part of my co-pending application, Serial No. 461,481, filed October 9, 1942, which issued as Patent No. 2,426,885 on September 2, 1947.

An object of this invention is to provide new and useful compounds of the general formula:

ROCH$_2$CONHR' wherein R is alkenyl and R' represents a hydrocarbon radical.

A further object of this invention is to provide processes for the preparation of these compounds.

Still a further object is the preparation of new compositions of matter which are useful as insectifuges and insecticides.

These and other objects will be apparent from the following more detailed description:

The new compounds of this invention may be prepared by reacting a primary amine with an alkenyloxyacetic acid, an alkenyloxyacetyl halide or an ester of an alkenyloxyacetic acid with a volatile alcohol. The reaction mixtures are heated for varying periods of time depending on the reactivities of the individual components. A slight excess of one of the components is generally employed. It has been found that satisfactory yields are obtained without the use of solvents in the reaction mixture. However, a suitable inert diluent such as benzene or toluene may be used. Where an acid chloride is employed the HCl formed may be removed either by heat or by the incorporation of small amounts of a suitable organic base such as pyridine, piperidine and the like. Where an ester is used, the volatile alcohol formed may be distilled off. When the free acid is used the water of reaction may be driven off by heat or removed by a dehydrating agent such as phosphorous trichloride.

The more detailed practice of the invention is illustrated by the following examples which, however, do not limit the scope of the invention in any way.

EXAMPLE 1

N-octyl alloxyacetamide

One tenth molar quantities of alloxyacetic acid and octylamine were mixed and refluxed in an oil bath at 160°–170° C. for four hours. The water of reaction was then distilled off under a pressure of 20 mm. The resulting reaction mixture was then fractionated under reduced pressure. Sixteen grams of N-octyl alloxyacetamide, a water white liquid boiling at 132°–135° C. at 3 mm. pressure, were obtained.

EXAMPLE 2

N-benzyl alloxyacetamide

Twelve grams of alloxyacetic acid and ten grams of benzylamine were refluxed in an oil bath for four hours. The water of reaction was distilled off under reduced pressure and the residue factionated. Eight and one-half grams of N-benzyl alloxyacetamide boiling at 140°–140.5° C. at 2 mm. pressure were obtained.

EXAMPLE 3

N-cyclohexyl crotoxyacetamide

Twenty-three grams of methyl crotoxyacetate and thirty grams of cyclohexylamine were refluxed together for eight hours. The alcohol of reaction was then removed by distillation under reduced pressure. The residue was dissolved in a benzene-ether mixture and fractionated under reduced pressure. N-cyclohexyl crotoxyacetamide was obtained as a water white liquid boiling at 110°–120° C. at 1 mm. pressure. The yield was thirty grams.

EXAMPLE 4

N-allyl methalloxyacetamide

Thirty grams of methyl methalloxyacetate and twelve grams of allyl amine were refluxed together for four hours. The reaction mixture was then distilled slowly to remove the alcohol of reaction and to permit the reaction to go to completion. The residue was then fractionated under reduced pressure. Ten grams of N-allyl methalloxyacetamide, a water white liquid boiling at 94°–96° C. at 2 mm. pressure were obtained.

EXAMPLE 5

N-methallyl methalloxyacetamide

Seventy-two grams of methyl methalloxyacetate and forty grams of methallylamine were refluxed together for a total of twenty hours. The reaction mixture was then distilled to remove the alcohol of reaction and the residue fractionated under reduced pressure. Thirty-six grams of N-methallyl methalloxyacetamide having a boiling range of 101°–106° C. at a pressure of 2.5 mm. were obtained.

I have prepared other members of this new series of N-substituted α-etherified acetamides by means of the afore-described methods as follows:

N-cyclohexyl alloxyacetamide
N-allyl crotoxyacetamide
N-isobutyl crotoxyacetamide
N-phenethyl crotoxyacetamide
N-butyl methalloxyacetamide
N-phenyl methalloxyacetamide
N-cyclohexyl methalloxyacetamide
N-octyl methalloxyacetamide
N-octyl crotoxyacetamide
N-amyl citronelloxyacetamide The new N-substituted α-etherified acetamides of my invention possess valuable insect combatting properties. They may be employed either as insecticides or insectifuges. However, they are particularly effective as insect repellents. The value of these new compounds for this latter purpose is enhanced by their desirable physical properties since they are for the most part non-viscous liquids whose color and odor are such as to make them unobjectionable for human use.

Table I demonstrates the efficacy of representative members of this new series of organic compounds against the common house fly, *Musca domestica*. The test procedure used was the "Sandwich bait" method substantially as described in Soap, June 1939, page 103 ff. A coating of molasses was applied to one side of a strip of blotting paper and dried to a hard glossy surface. The molasses was then covered with a strip of a special, thin, porous paper which had previously been immersed in a five per cent solution in alcohol of the compound to be tested and then dried until the alcohol had evaporated. For purposes of comparison one strip was treated only with solvent and dried. The strips prepared in this fashion were mounted on a board and introduced into a large cage containing more than 2,000 hungry house flies. By making observations at frequent intervals, the duration of repellency, that is the length of time which elapsed before the flies began to feed on the molasses through the treated tissues, was determined.

TABLE I

| Compound* | Duration of repellency to house flies |
|---|---|
| N-Octyl alloxyacetamide | 8 hrs. 35 min.[1]† |
| N-Octyl methalloxyacetamide | 6 hrs. 10 min.[2]† |
| N-Octyl crotoxyacetamide | 6 hrs. 10 min.[3]† |
| N-Cyclohexyl crotoxyacetamide | 4 hrs. |
| N-Cyclohexyl methalloxyacetamide | 2 hrs. 40 min. |
| N-Butyl methalloxyacetamide | 5 hrs. 15 min. |
| N-Allyl crotoxyacetamide | 2 hrs. |
| N-Phenethyl crotoxyacetamide | 1 hr. 20 min. |
| N-Allyl methalloxyacetamide | 1 hr. 30 min. |

*Tested in 5 per cent concentration.
†Bait still untouched at end of this period. Flies had to be fed at this point.
[1] Bait treated with this compound continuously exposed to flies until it was attacked on the sixth day. Flies fed at 24-hour intervals a minimum to keep them from dying of starvation.
[2] Bait treated with this compound continuously exposed to flies until it was attacked late the third day. Flies fed at 24-hour intervals a minimum to keep them from dying of starvation.
[3] Bait treated with this compound continuously exposed to flies until it was attacked late the second day. Flies fed at 24-hour intervals a minimum to keep them from dying of starvation.

Not only do the compounds of my invention possess marked repellency to house flies, but they are also very effective against such annoying pests as mosquitoes.

One cc. of the compound to be tested was applied to the forearm of an individual and the arm exposed in a cage full of hungry *Aedes aegypti* mosquitoes. The following are the results obtained with with representative members of my new compounds:

TABLE II

| Compound | Duration of Repellency |
|---|---|
| | Min. |
| N-Isobutyl crotoxyacetamide | 358 |
| N-Cyclohexyl methalloxyacetamide | 319 |

Furthermore, the new compounds of my invention possess insecticidal properties. Table III illustrates the efficacy of representative members of this new series of N-substituted α-etherified acetamides against house flies. The Peet-Grady bio-assay technique was employed in these tests. The solutions were made up in a deodorized kerosene base.

TABLE III

| Compound | Concentration, percent by weight | Percent Knockdown in 10 mins. | Percent Kill after 24 hrs. |
|---|---|---|---|
| N-Octyl alloxyacetamide | 5 | 95 | 71 |
| N-Cyclohexyl crotoxyacetamide | 5 | 99 | 90 |
| N-Phenethyl crotoxyacetamide | 5 | 94 | 16 |
| N-Octyl methalloxyacetamide | 5 | 86 | 36 |

These new compounds of my invention may be employed by direct topical application, or they may be incorporated into liquid or solid carriers. They are especially useful as the active ingredients of insect-repellent lotions, creams, ointments and the like. They may be dissolved in liquid diluents such as alcohol, aqueous alcohol, isopropanol, dimethyl phthalate and hydrocarbon oils such as kerosene, or emulsified in water, if necessary with the aid of a suitable dispersing agent. If desired, they may be admixed with finely divided carriers such as diatomaceous earth, talc, pyrophylite, bentonite, etc.

Furthermore, these compounds may be combined with insecticidal materials such as pyrethrum, rotenone, derris, cubé, DDT and the like. Such a combination is particularly effective because of the added repellent properties where the paralytic and lethal action of the insecticide is slow.

Although this invention has been described with reference to illustrative embodiments thereof, it will be apparent to those skilled in the art that the principles of this invention may be embodied in other forms but within the scope of the appended claims.

I claim:
1. The N-substituted alkenyloxyacetamides having the general formula:

ROCH₂CONHR′ wherein R is alkenyl and R′ is hydrocarbon.
2. The N-substituted alkenyloxyacetamides having the general formula:

ROCH₂CONHAlkyl wherein R is alkenyl.
3. The N-substituted alkenyloxyacetamides having the general formula:

ROCH₂CONHCycloalkyl wherein R is alkenyl.
4. The N-substituted alkenyloxyacetamides having the general formula:

ROCH₂CONHAlkenyl wherein R is alkenyl.
5. N-octyl alloxyacetamide.
6. N-methallyl methalloxyacetamide.
7. N-cyclohexyl methalloxyacetamide.
8. The process of preparing N-substituted alkenyloxyacetamides which comprises reacting a compound of the general formula:

ROCH₂COZ wherein R is alkenyl and Z is a radical selected from the group consisting of hydroxyl, halogen and OY, Y being the hydrocarbon radical of an esterifying volatile alcohol, with a primary amine of the general formula:

R'NH₂ wherein R' is hydrocarbon.
9. An insect combative composition of matter comprising as essential active ingredient an N-substituted alkenyloxy-acetamide having the general formula:

ROCH₂CONHR' wherein R is alkenyl and R' is hydrocarbon, and a carrier therefor.
10. An insect combative composition of matter comprising as essential active ingredient an N-substituted alkenyloxyacetamide having the general formula:

ROCH₂CONHAlkyl wherein R is alkenyl, and a carrier therefor.
11. An insect combative composition of matter comprising as essential active ingredient an N-substituted alkenyloxyacetamide having the general formula:

ROCH₂CONHCycloalkyl wherein R is alkenyl, and a carrier therefor.
12. An insect combative composition of matter comprising as essential active ingredient an N-substituted alkenyloxyacetamide having the general formula:

ROCH₂CONHAlkenyl wherein R is alkenyl, and a carrier therefor.

13. An insect combative composition of matter comprising as essential active ingredient N-octyl alloxyacetamide and a carrier therefor.
14. An insect combative composition of matter comprising as essential active ingredient N-methallyl methalloxyacetamide and a carrier therefor.
15. An insect combative composition of matter comprising as essential active ingredient N-cyclohexyl methalloxyacetamide and a carrier therefor.
16. An insect combative composition of matter comprising as essential active ingredient an N-substituted alkenyloxyacetamide having the general formula:

ROCH₂CONHR' wherein R is alkenyl and R' is hydrocarbon, dissolved in an aliphatic alcohol.
17. An insect combative composition of matter comprising as essential active ingredient an N-substituted alkenyloxyacetamide having the general formula:

ROCH₂CONHR' wherein R is alkenyl and R' is hydrocarbon, dissolved in a hydrocarbon solvent.
18. An insect combative composition of matter comprising as essential active ingredient an N-substituted alkenyloxyacetamide having the general formula:

ROCH₂CONHR' wherein R is alkenyl and R' is hydrocarbon, dissolved in aqueous alcohol.

LOWELL B. KILGORE.

REFERENCES CITED

The following references are of record in the file of this patent:

UNITED STATES PATENTS

| Number | Name | Date |
|---|---|---|
| 2,169,578 | Bruson et al. | Aug. 15, 1939 |
| 2,347,494 | Meigs | Apr. 25, 1944 |
| 2,382,433 | McNally et al. | Aug. 14, 1945 |
| 2,426,885 | Kilgore | Sept. 2, 1947 |